May 20, 1924.
M. F. KLEINPETER
ANIMAL TRAP
Filed March 24, 1922
1,494,918
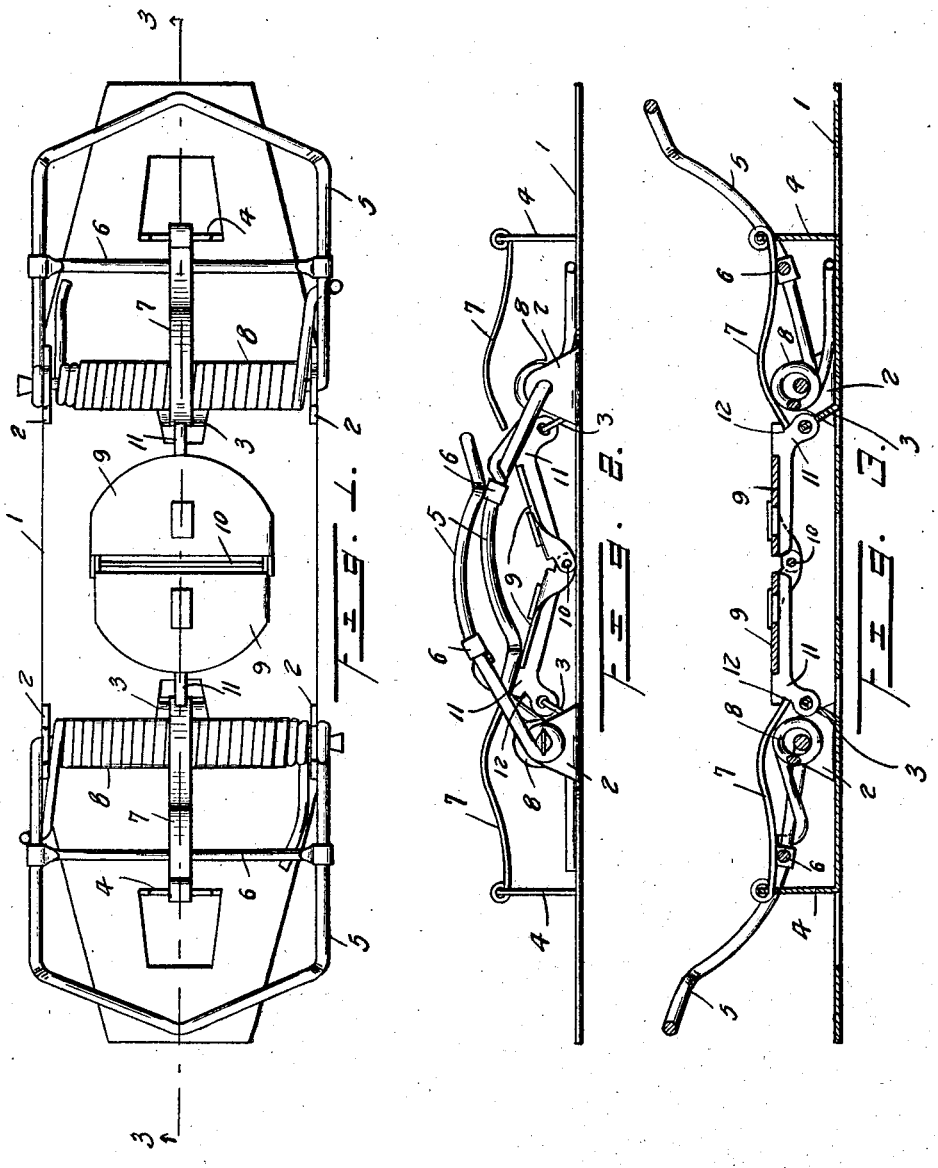
Inventor
M. F. Kleinpeter.

Patented May 20, 1924.

1,494,918

UNITED STATES PATENT OFFICE.

MICHAEL F. KLEINPETER, OF MORGAN CITY, LOUISIANA.

ANIMAL TRAP.

Application filed March 24, 1922. Serial No. 546,469.

*To all whom it may concern:*

Be it known that I, MICHAEL F. KLEIN-PETER, a citizen of the United States, residing at Morgan City, in the parish of Saint Mary and State of Louisiana, have invented certain new and useful Improvements in Animal Traps; and I do hereby declare the following to be a full, clear, and exact description of the invention, such as will enable others skilled in the art to which it appertains to make and use the same.

This invention has for its object the provision of a trap of the jaw type which, in operation, will kill the animal by breaking its back, thereby resulting practically in instant death and avoiding torture which results when the animal is caught between coacting jaws.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view of an animal trap embodying the invention, showing the same set, Figure 2 is a side view indicating the position of the parts when the trap is sprung, and Figure 3 is a vertical, central longitudinal section on the line 3—3 of Figure 1.

Corresponding and like parts are referred to in the following description and designated in the several views of the drawings by like reference characters.

The trap comprises an elongated base 1 which may be of any material, preferably sheet metal. Pairs of ears 2 form part of the base 1 and are disposed upon opposite sides of a medial transverse line. Portions 3 and 4 are partly cut from the base 1 and bent upwardly to provide extensions for receiving the trigger and detent devices, respectively.

Complemental jaws 5 are pivotally mounted upon opposite end portions of the base 1 in the respective pairs of ears 2 and are so disposed that when the trap is sprung end portions of the jaws overlap, as indicated most clearly in Figure 2. The jaws 5 are formed of stout wire and are deflected in their length so as to clear the trigger mechanism. An intermediate rod 6 connects the side members of each of the jaws 5 and braces the same, besides providing means for cooperating with the pivoted detents 7 which, in conjunction with the trigger mechanism, hold the cooperating jaws open or extended, as indicated most clearly in Figures 1 and 3. A spring 8 cooperates with each of the jaws 5 in a manner well understood in traps of the nature of the present invention. The detents 7 are pivoted to the extensions 4, each cooperating with a jaw 5 and an element of the trigger mechanism.

The trigger mechanism comprises complemental plates 9 which are pivotally connected at 10. An arm 11 extends outwardly from each of the plates 9 and is pivoted to an extension 3. Each of the arms 11 has its butt or heel portion provided with a notch 12 to receive the end of the detent 7 cooperating therewith. When the trap is set, the jaws 5 are extended and the detents 7 pass over the intermediate rods 6 and engage the notches 12 of the respective arms 11. This is indicated most clearly in Figure 3. The bait (not shown) is placed upon the plates 9 and may be secured thereto in any preferred way. Pressure upon the plate 9 operates the trigger mechanism, whereby to release the detent 7 and the jaws 5, the latter swinging upwardly and downwardly and striking the back of the animal from above and resulting in instant death.

In operation, with the trap set as in Figures 1 and 3, the detents 7 by engagement in the notches or recesses 12 prevent the springing of the trap. With bait supported on the triggers 9 and attacked by a rodent, the weight of the rodent on the trigger mechanism will tilt one of the triggers 9 almost invariably more than the other trigger 9, thus releasing the detent 7 of one of the jaws 5 before releasing the detent 7 of the other jaw 5. The jaw 5 first released, under urgency of its spring 8 will move upwardly and inwardly from its fulcrum in the extensions 2. Movement of the first trigger 9, due to the pivotal connection at 10 will also move the other trigger 9 releasing detent 7 and causing the jaw 5 associated therewith to swing upwardly and downwardly and over the first mentioned jaw 5, into the position shown in Figure 2. It will be seen that both of the jaws extend a substantial distance across and beyond the pivot 10 to insure breakage of the back of the animal or rodent. After a capture, the captive may be removed by springing back or resetting jaws 5 through engagement of the detents 7 in the recesses 12.

What is claimed is:

1. An animal trap comprising a base, complemental spring-urged jaws pivoted to the base and adapted to swing against the base with their end portions overlapping, a double trigger mechanism mounted upon the base intermediate the jaws, the jaws in sprung position extending across and a considerable distance beyond the line of connection of the trigger to break the back of the captive, and detents pivoted to opposite end portions of the base and adapted to cooperate with the trigger mechanism to hold the jaws extended.

2. An animal trap of the character specified, comprising an elongated base, complemental spring-urged jaws pivoted to the base and adapted to swing against the base with their end portions overlapping, each of the jaws including an intermediate rod, a double trigger mechanism mounted upon the base intermediate the jaws, the jaws in sprung position extending across and a considerable distance beyond the line of connection of the trigger to break the back of the captive, and detents pivoted upon opposite end portions of the base and adapted to engage the intermediate rods of the jaws and coperate with the trigger mechanism to hold said jaws extended.

3. An animal trap of the character specified, comprising a base, complemental spring-urged jaws pivoted to the base and adapted to swing against the base and have their end portions overlapped, a trigger mechanism comprising complemental plates pivotally connected together and having arms extending therefrom and pivoted to the base, the jaws in sprung position extending across and a considerable distance beyond the line of pivotal connection of the triggers to break the back of the captive; and detents pivoted to the base and cooperating with the arms of the trigger mechanism to hold the jaws extended.

In testimony whereof I affix my signature in presence of two witnesses.

MICHAEL F. KLEINPETER.

Witnesses:
   CHAS. A. BIBBINS,
   H. M. YOUNG.